United States Patent [19]

Kowarsch et al.

[11] Patent Number: 4,940,492
[45] Date of Patent: Jul. 10, 1990

[54] COLORANT MIXTURES CONTAINING ISOQUINOLINE DERIVATIVES, USE THEREOF IN PRINTING INKS, AND NOVEL ISOQUINOLINE DERIVATIVES

[75] Inventors: Heinrich Kowarsch, Oberderdingen; Johannes P. Dix, Neuhofen, both of Fed. Rep. of Germany

[73] Assignee: BASF Aktiengesellschaft, Ludwigshafen, Fed. Rep. of Germany

[21] Appl. No.: 209,586

[22] Filed: Jun. 22, 1988

[30] Foreign Application Priority Data

Jun. 30, 1987 [DE] Fed. Rep. of Germany ....... 3721498

[51] Int. Cl.$^5$ .................. C09B 29/44; C09B 67/20; C09B 67/22; C09D 11/00
[52] U.S. Cl. ...................... 106/494; 106/22; 106/496; 106/23; 8/639; 534/573; 534/575; 534/651; 534/789; 534/582
[58] Field of Search ............... 534/573 M, 651, 789, 534/573 L; 106/22; 8/639

[56] References Cited

U.S. PATENT DOCUMENTS 4,491,544 1/1985 Radtke et al. ................. 534/655

Primary Examiner—Floyd D. Higel
Attorney, Agent, or Firm—Oblon, Spivak, McClelland, Maier & Neustadt

[57] ABSTRACT

Colorant mixtures for use in printing inks contain isoquinoline-azo pigments of the formula I

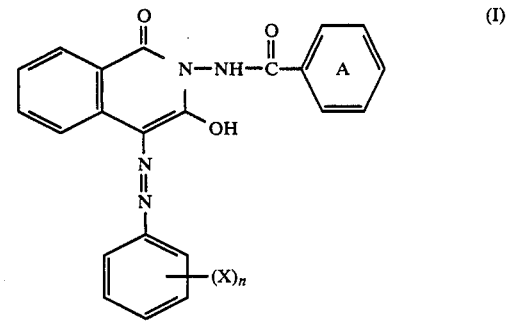

where
X is chlorine, bromine, $C_1$–$C_4$-alkoxy or nitro,
n is 1, 2 or 3, and the ring A can be substituted, and an isoquinoline-azo dye of the formula II

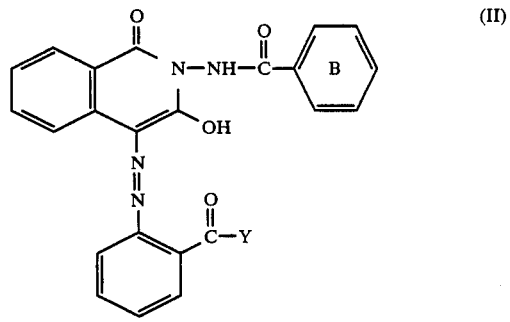

where
Y is $C_6$–$C_{20}$-alkoxy which may be interrupted by one or more oxygen atoms, and the ring B can be substituted.

10 Claims, No Drawings

COLORANT MIXTURES CONTAINING ISOQUINOLINE DERIVATIVES, USE THEREOF IN PRINTING INKS, AND NOVEL ISOQUINOLINE DERIVATIVES

The present invention provides novel colorant mixtures containing isoquinoline-azo pigments and isoquinoline-azo dyes, a method of using same in printing inks, and novel isoquinoline-azo dyes.

EP-A-No. 74,048 discloses isoquinoline-azo pigments which are particularly suitable for use in printing inks.

The color strength and the transparency of these pigments increase with decreasing crystal size. It is therefore of interest to reduce the crystal particles in size in a specific manner.

However, a reduction in crystal size leads to a corresponding increase in the vicosity of the printing ink containing the pigments and to a deterioration in the gloss of the prints produced therefrom. The end use thus dictates a lower limit of crystal size.

It is an object of the present invention to provide novel colorant mixtures which no longer have the abovementioned disadvantages and which give better utilization of the color strength of isoquinoline-azo pigments.

We have found that this object is achieved with a novel colorant mixture containing an isoquinoline-azo pigment of the formula I

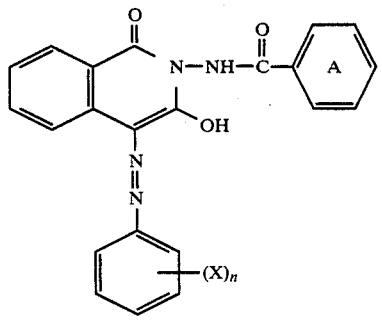

where
X is chlorine, bromine, $C_1$–$C_4$-alkoxy or nitro,
n is 1, 2 or 3, and the ring A can be substituted, and an isoquinoline-azo dye of the formula II

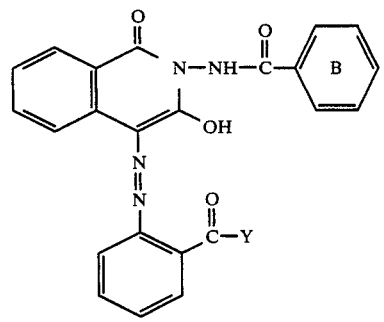

where
Y is $C_6$–$C_{20}$-alkoxy which may be interrupted by one or more oxygen atoms, and the ring B can be substituted.

Any alkyl appearing in the abovementioned formulae I and II can be not only straight-chain but also branched.

X in the formula I is for example methoxy, ethoxy, propoxy, isopropoxy, butoxy, isobutoxy, sec-butoxy or tert-butoxy.

Y in the formula II is for example hexyloxy, 2-methylpentyloxy, heptyloxy, octyloxy, 2-ethylhexyloxy, isooctyloxy, nonyloxy, isononyloxy, decyloxy, isodecyloxy, undecyloxy, dodecyloxy, tridecyloxy, 3,5,5,7-tetramethylnonyloxy, isotridecyloxy, tetradecyloxy, pentadecyloxy, hexadecyloxy, heptadecyloxy, octadecyloxy, nonadecyloxy, eicosyloxy (the designations isooctyl, isononyl, isodecyl and isotridecyl are trivial names due to the corresponding oxo alcohols—cf. Ullmann's Enzyklopadie der technischen Chemie, 4th edition, volume 7, pages 215 to 217, and volume 11, pages 435 and 436), 2-methoxyethoxy, 2-ethoxyethoxy, 2-butoxyethoxy, 3-methoxypropoxy, 2-methoxypropoxy, 2-methoxybutoxy, 2-ethoxybutoxy, 4-methoxybutoxy, 4-ethoxybutoxy, 3,6-dioxahexyloxy, 3,6-dioxaoctyloxy, 3,6-dioxadecyloxy, 3,6,9-trioxadecyloxy, 3,6,9-trioxaundecyloxy or 3,6,9-trioxatridecyloxy.

An alkyl chain in the radical Y interrupted by oxygen atoms is preferably interrupted by one, two or three oxygen atoms.

Suitable substituents on the ring A in formula I and/or the ring B in the formula II are for example $C_1$–$C_4$-alkyl, $C_1$–$C_4$-alkoxy, nitro and halogen. These rings A and B can be substituted identically or differently and each have one or more substituents.

Isoquinoline-azo dyes of the formula II are novel. They can be prepared in a conventional manner by diazotization of the corresponding anthranilic esters and coupling onto isoquinolines as described in EP-A-No. 74,048.

Colorant mixtures containing isoquinoline-azo dyes of the formula II where Y is $C_8$–$C_{14}$-alkoxy are preferred.

Particular preference is given to colorant mixtures containing isoquinoline-azo dyes of the formula II where Y is 2-ethylhexyl, isononyl, decyl, isodecyl or isotridecyl. As mentioned above, the isononyl, isodecyl and isotridecyl compounds are isomer mixtures.

Isoquinoline-azo pigments of the formula I are known from EP-A-No. 74,048.

Preference is given to those colorant mixtures containing isoquinoline-azo pigments of the formula I derived from the diazo component 2-nitroaniline, 2-methoxyaniline, 4-chloro-2-nitroaniline, 4-methoxy-2-nitroaniline or 2,5-dichloraniline.

The isoquinoline-azo pigments of the formula I can also be present as mixtures.

The novel colorant mixtures contain isoquinoline-azo pigments of the formula I or mixtures thereof and isoquinoline-azo dyes of the formula II or mixtures thereof in a weight ratio of from 55:45 to 95:5, preferably of from 70:30 to 90:10.

The most suitable mixing ratio of long-chain dye of the formula II : pigment of the formula I depends in the final analysis on the properties desired for the printing ink and is readily determinable in simple preliminary trials.

The novel colorant mixtures can be produced either by mixing the water-moist presscakes of pigment I and dye II or by dry mixing of pigment I and dye II. However, it is also possible to diazotize the respective diazo components of pigment I and dye II separately and then to couple the diazotization products together onto the isoquinoline coupling component.

The colorant mixtures according to the invention are advantageously used for producing gravure printing inks, in particular those based on toluene. To this end, they are incorporated in a conventional manner in the printing ink.

In use in toluene gravure printing the colorant mixtures according to the invention are superior to the prior art isoquinoline-azo pigments of the formula I in that the prints are glossier, more transparent, and stronger in color on uncoated paper. Furthermore, the prints give less strikethrough on thin papers. These improved properties are even retained on storage of the printing ink, so that corrections before use are unnecessary.

The invention is further illustrated by the following Examples:

EXAMPLE 1

160 g of isotridecyl anthranilate were stirred in 160 g of glacial acetic acid and 160 ml of ice-water together with 150 ml of 32% strength by weight hydrochloric acid. After addition of a further 600 ml of ice-water, 150 g of 23% strength by weight sodium nitrite solution were added rapidly. The solution was bulked with 2,000 ml of ice-water and subsequently stirred for about 30 minutes.

This diazonium salt solution was run into a mixture of 155 g of the coupling component of the formula

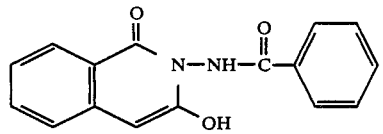

5,000 ml of water and 280 g of 50% strength by weight sodium hydroxide solution. In the course of the addition, the temperature moved to from 10° to 15° C. and the pH to from 8 to 9. The suspension was then stirred for 30 minutes and filtered with suction, and the residue was washed neutral with water and sucked as dry as possible.

This gave 1,020 g of a presscake whose dye content was 26% by weight.

500 g of this water-moist press material were dried at 70° C. in a vacuum drying cabinet to leave 130 g of a greenish yellow dye powder (melting point: 168°–172° C.).

EXAMPLE 2

85 g of the pigment of the formula

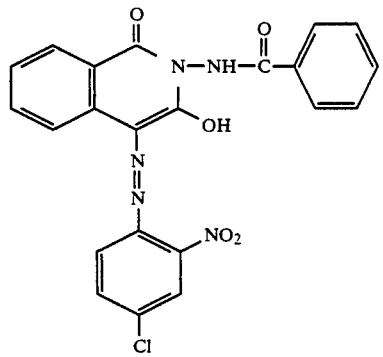

prepared as described in EP-A-No. 74,048 were mixed and milled with 15 g of the dye of Example 1 to give a yellow colorant preparation.

To produce a toluene-based gravure printing ink, 12 g of this preparation were dispersed with 138 g of a commercially available phenol-modified rosin solution (about 35% strength by weight in toluene) and 300 g of steel balls (diameter: 2–3 mm) in a disperser for 30 minutes and adjusted with toluene to printing viscosity.

The prints produced with this gravure printing ink were more transparent, glossier and stronger in color than prints produced in the same way which contained only the pigment known from EP-A-No. 74,048.

EXAMPLE 3

690 g of presscake material (13% strength by weight) of a pigment of the formula Ia

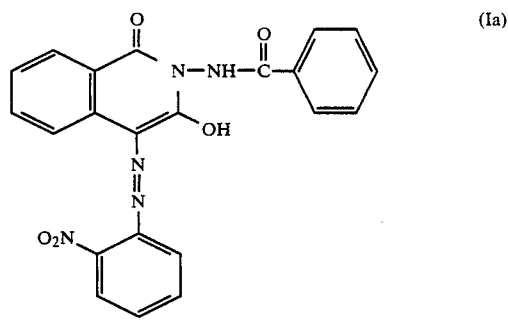

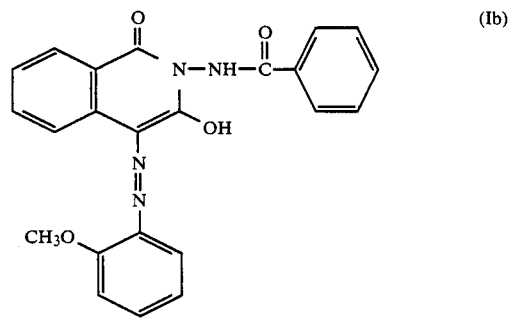

were mixed with 10 g of presscake material (14% strength by weight) of a pigment of the formula Ib and 30 g of presscake material (36% strength by weight) of a dye of the formula

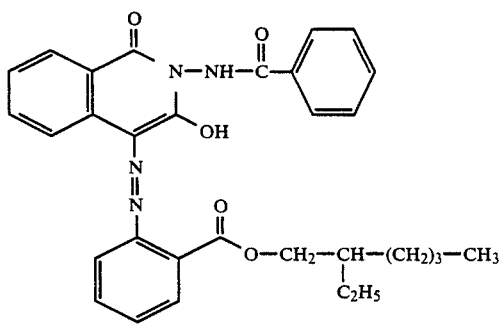

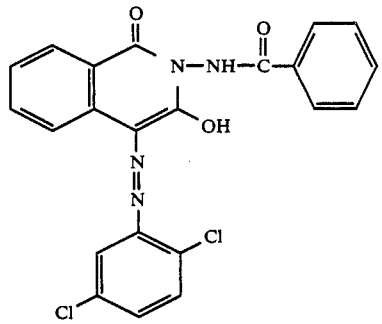

in 500 ml of water at pH 7–8 at 60° C. for about 1 hour (the two pigments having been prepared as described in EP-A-No. 74,048). This is followed by filtration with suction, washing neutral with water and drying to leave 100 g of a reddish yellow colorant preparation. It had similar properties as the preparation produced in Example 2.

EXAMPLE 4

19 g of a pigment of the formula

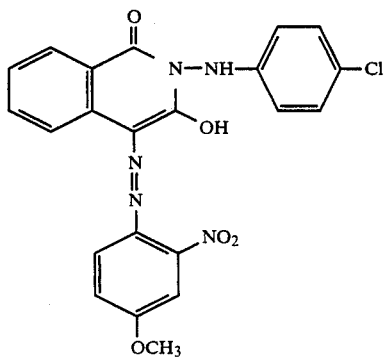

prepared as described in EP-A-No. 74,048 and 6 g of the dye prepared as in Example 1 (except for isononyl anthranilate as the diazo component) were dispersed together with 300 g of steel balls (diameter: 2 mm), 25 ml of toluene and 100 g of commercial lime resinate (50% strength by weight in 1 : 1 toluene/methylcyclohexane) in a disperser for 30 minutes. After the balls had been separated off, a binder mixture (75 g of the said lime resinate solution and 25 g of toluene) was added to adjust the pigment content to 10% strength by weight, and the formulation was dispersed for a further 5 minutes.

The orange printing color obtained gave transparent prints of high color strength having an appreciably superior gloss than prints produced in the same way but only with the pigment alone.

EXAMPLE 5

() g of the pigment of the formula obtained as described in EP-A-No. 74,048 were mixed and milled together with 4 g of a dye prepared as described in Example 1 (except with decyl anthranilate as the diazo component).

A gravure printing ink produced therefrom as described in Example 2 gave strong greenish yellow prints of high gloss and high transparency.

EXAMPLE 6 (MIXED COUPLING)

30.5 g of 4-methyl-2-nitroaniline were diazotized in a conventional manner (EP-A-No. 74,048) and clarified (solution A).

6.5 g of isotridecyl anthranilate were diazotized as described in Example 1 and likewise clarified (solution B).

58 g of the coupling component of Example 1 were dissolved in 32 g of sodium hydroxide solution (50% strength by weight) and 1,000 ml of water and cooled down with ice to 5° C. (solution C).

Solutions A and B were combined and cooled down with ice to 0° C. Solution C was then added in the course of 15 minutes, during which the pH moved to about 3.5 and the temperature to 3° C. The coupling batch was subsequently stirred for 2 hours and filtered with suction at room temperature. Washing and drying left 90 g of a reddish yellow colorant preparation. The printing ink produced therefrom had similar properties as the formulation obtained in Example 4.

We claim:

1. A colorant mixture containing an isoquinoline-azo pigment of the formula I

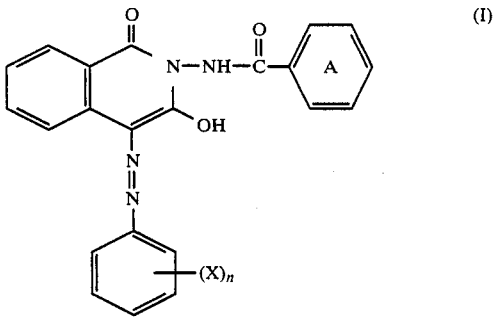

wherein X is chlorine, bromine, $C_1$–$C_4$ alkoxy or nitro; n is 1, 2 or 3; and an isoquinoline-azo dye of formula

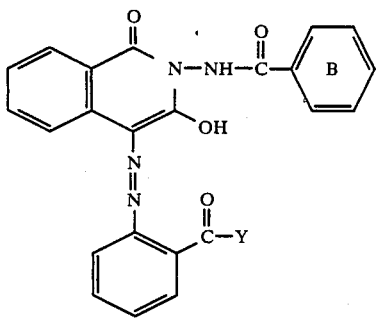

(II)

wherein Y is $C_6$–$C_{20}$-alkoxy or $C_6$–$C_{20}$ alkoxy which contains one or more ether linkages.

2. The colorant mixture of claim 1, wherein group Y is $C_8$–$C_{14}$-alkoxy.

3. The colorant mixture of claim 1, wherein said $C_6$–$C_{20}$ alkoxy substituent for group Y is hexyloxy, 2-methylpentyloxy, heptyloxy, octyloxy, 2-ethylhexyloxy, isooctyloxy, nonyloxy, isononyloxy, decyloxy, isodecyloxy, undecyloxy, dodecyloxy, tridecyloxy, 3,5,5,7-tetramethylnonyloxy, isotridecyloxy, tetradecyloxy, pentadecyloxy, hexadecyloxy, heptadecyloxy, octadecyloxy, nonadecyloxy or eicosyloxy.

4. The colorant mixture of claim 1, wherein each of rings A and B is substituted by one or more members selected from the group consisting of $C_1$–$C_4$-alkyl, $C_1$–$C_4$-alkoxy, nitro and halogen.

5. The colorant mixture of claim 1, wherein said $C_6$–$C_{20}$ alkoxy Y substituent is 2-methoxyethoxy, 2-ethoxyethoxy, 2-butoxyethoxy, 3-methoxypropoxy, 2-methoxypropoxy, 2-methoxybutoxy, 2-ethoxybutoxy, 4-methoxybutoxy, 4-ethoxybutoxy, 3,6-dioxahexyloxy, 3,6-dioxaoctyloxy, 3,6-dioxadecyloxy, 3,6,9-trioxadecyloxy, 3,6,9-trioxaundecyloxy or 3,6,9-trioxatridecyloxy.

6. The colorant mixture of claim 1, wherein said mixture contains from 55% to 95% by weight of said isoquinoline-azo pigment of formula I and from 45% to 5% by weight of said isoquinoline-azo dye of formula II.

7. An isoquinoline-azo dye of the formula II

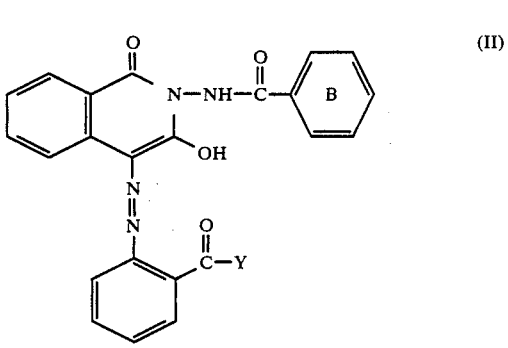

(II)

where Y is $C_6$–$C_{20}$-alkoxy which contains one or more ether linkages.

8. The colorant mixture of claim 6, wherein the amount of pigment of formula I to the amount of dye of formula II ranges from 70:30 to 90:10.

9. The isoquinoline-azo dye of claim 7 wherein the B ring is substituted by one or more members selected from the group consisting of $C_1$–$C_4$-alkyl, $C_1$–$C_4$-alkoxy, nitro and halogen.

10. An isoquinoline-azo pigment of the formula I

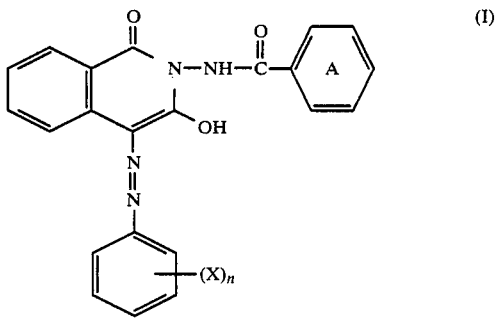

(I)

wherein the A ring is substituted by one or more members selected from the group consisting of $C_1$–$C_4$-alkyl, $C_1$–$C_4$-alkoxy, nitro and halogen.

* * * * *